US010565295B1

(12) United States Patent
Eisner et al.

(10) Patent No.: US 10,565,295 B1
(45) Date of Patent: Feb. 18, 2020

(54) DOCUMENT VERSION CONTROL IN COLLABORATIVE ENVIRONMENT

(71) Applicant: Amazon Technologies, Inc., Reno, NV (US)

(72) Inventors: Noah Anthony Eisner, Menlo Park, CA (US); Kevin Gillett, Seattle, WA (US); Himanshu Khurana, Seattle, WA (US); Arun Ponniah Sethuramalingam, San Jose, CA (US); Liangliang Wang, Foster City, CA (US); Sharad Kala, Sunnyvale, CA (US); Frank Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/077,210

(22) Filed: Nov. 11, 2013

(51) Int. Cl.
*G06F 17/22* (2006.01)
*G06F 17/24* (2006.01)

(52) U.S. Cl.
CPC ........ *G06F 17/2288* (2013.01); *G06F 17/241* (2013.01)

(58) Field of Classification Search
CPC . G06F 17/241; G06F 17/2247; G06F 17/2288
See application file for complete search history.

(56) References Cited

U.S. PATENT DOCUMENTS

| | | | |
|---|---|---|---|
| 5,251,315 A | 10/1993 | Wang | |
| 5,577,188 A * | 11/1996 | Zhu | G06F 3/0481 715/202 |
| 5,596,754 A | 1/1997 | Lomet | |
| 5,832,470 A | 11/1998 | Morita et al. | |
| 5,878,398 A | 3/1999 | Tokuda et al. | |
| 5,911,140 A | 6/1999 | Tukey et al. | |
| 5,991,713 A | 11/1999 | Unger et al. | |
| 6,314,425 B1 | 11/2001 | Serbinis et al. | |
| 6,397,205 B1 | 5/2002 | Juola | |

(Continued)

FOREIGN PATENT DOCUMENTS

| | | |
|---|---|---|
| JP | H10240220 A | 9/1998 |
| JP | 2003067330 A | 3/2003 |

(Continued)

OTHER PUBLICATIONS

Eppstein, David et al., What's the Difference? Efficient Set Reconciliation Without Prior Context?, SIGCOMM '11 Aug. 15-19, 2011, Toronto Ontario, Canada.

(Continued)

*Primary Examiner* — Thu V Huynh
(74) *Attorney, Agent, or Firm* — Davis Wright Tremaine LLP

(57) ABSTRACT

Organizations maintain and generate large amounts of documentation and entities of these organizations often need to collaborate on generating and reviewing this information. There is a need to maintain and store this documentation remotely in such a way that the entities of these organizations may collaborate with each other. To ensure that information is handled effectively, new versions are created for documents uploaded to a service provider by entities of the organization. The documents are processed in such a way that the documents are displayed uniformly across a variety of devices.

22 Claims, 8 Drawing Sheets

(56) References Cited

U.S. PATENT DOCUMENTS

| | | |
|---|---|---|
| 6,442,555 B1 | 8/2002 | Shmueli et al. |
| 6,505,195 B1 | 1/2003 | Ikeda et al. |
| 6,553,365 B1 | 4/2003 | Summerlin et al. |
| 6,687,876 B1 | 2/2004 | Schilit et al. |
| 6,687,878 B1 | 2/2004 | Eintracht et al. |
| 6,725,239 B2 | 4/2004 | Sherman et al. |
| 6,763,346 B1 | 7/2004 | Nishida et al. |
| 7,177,886 B2 | 2/2007 | Pruet |
| 7,882,110 B2 | 2/2011 | Bahr |
| 8,429,753 B2 | 4/2013 | Skaria et al. |
| 8,527,461 B2 | 9/2013 | Ducott et al. |
| 8,655,950 B2 | 2/2014 | Scherpa et al. |
| 8,825,502 B2 | 9/2014 | Bormann et al. |
| 8,843,494 B1 | 9/2014 | Sampson |
| 8,938,669 B1 | 1/2015 | Cohen |
| 9,020,893 B2 | 4/2015 | Zalpuri et al. |
| 9,047,368 B2 | 6/2015 | Cooley |
| 9,106,687 B1 | 8/2015 | Sawhney et al. |
| 9,208,153 B1 | 12/2015 | Zaveri et al. |
| 9,253,075 B2 | 2/2016 | Jacobson et al. |
| 9,270,446 B2 | 2/2016 | Ayday et al. |
| 9,400,800 B2 | 7/2016 | Jacobson et al. |
| 9,449,182 B1 | 9/2016 | Dang et al. |
| 9,536,047 B2 | 1/2017 | Ayday et al. |
| 9,633,100 B2 | 4/2017 | Kashyap et al. |
| 9,832,195 B2 | 11/2017 | Gillett et al. |
| 9,880,989 B1 | 1/2018 | Cadabam et al. |
| 10,257,196 B2 | 4/2019 | Dang et al. |
| 2001/0042085 A1 | 11/2001 | Peairs et al. |
| 2002/0138529 A1 | 9/2002 | Yang-Stephens et al. |
| 2003/0061221 A1 | 3/2003 | Ito et al. |
| 2003/0074368 A1 | 4/2003 | Schuetze et al. |
| 2004/0068697 A1 | 4/2004 | Harik et al. |
| 2004/0205542 A1* | 10/2004 | Bargeron ............. G06F 17/241 715/201 |
| 2004/0210833 A1* | 10/2004 | Lerner ................. G06F 3/04883 715/201 |
| 2004/0230577 A1 | 11/2004 | Kawatani |
| 2004/0267746 A1 | 12/2004 | Marcjan et al. |
| 2005/0010799 A1 | 1/2005 | Kelley et al. |
| 2005/0022106 A1 | 1/2005 | Kawai et al. |
| 2005/0034062 A1 | 2/2005 | Bufkin et al. |
| 2005/0038787 A1* | 2/2005 | Cheung ............. G06F 17/30864 |
| 2005/0044494 A1 | 2/2005 | Barnes et al. |
| 2005/0055306 A1 | 3/2005 | Miller et al. |
| 2005/0160356 A1* | 7/2005 | Albornoz ............. G06F 17/241 715/229 |
| 2005/0240580 A1 | 10/2005 | Zamir et al. |
| 2005/0251675 A1 | 11/2005 | Marcjan et al. |
| 2006/0053365 A1 | 3/2006 | Hollander et al. |
| 2006/0125846 A1* | 6/2006 | Springer ................. G09B 5/02 345/629 |
| 2006/0150079 A1 | 7/2006 | Albornoz et al. |
| 2006/0183462 A1 | 8/2006 | Kolehmainen |
| 2006/0248083 A1 | 11/2006 | Sack et al. |
| 2006/0294311 A1 | 12/2006 | Fu et al. |
| 2007/0011140 A1 | 1/2007 | King et al. |
| 2007/0118795 A1* | 5/2007 | Noyes ................... G06F 17/241 715/203 |
| 2007/0150802 A1 | 6/2007 | Wan et al. |
| 2007/0156732 A1 | 7/2007 | Surendran et al. |
| 2007/0208994 A1* | 9/2007 | Reddel ................. G06F 17/2288 715/205 |
| 2007/0271249 A1* | 11/2007 | Cragun ............. G06F 17/30067 |
| 2008/0040342 A1 | 2/2008 | Hust et al. |
| 2008/0052291 A1 | 2/2008 | Bender |
| 2008/0222512 A1* | 9/2008 | Albornoz .......... G06F 17/30011 715/230 |
| 2009/0217158 A1 | 8/2009 | Bailey |
| 2009/0260060 A1 | 10/2009 | Smith et al. |
| 2009/0265747 A1 | 10/2009 | Li |
| 2010/0010998 A1 | 1/2010 | Wagner |
| 2010/0030578 A1 | 2/2010 | Siddique et al. |
| 2010/0095203 A1* | 4/2010 | Toebes ................. G06F 17/2288 715/277 |
| 2010/0174983 A1 | 7/2010 | Levy et al. |
| 2010/0211781 A1 | 8/2010 | Auradkar et al. |
| 2010/0241668 A1 | 9/2010 | Susanto et al. |
| 2010/0318893 A1* | 12/2010 | Matthews ............. G06F 17/241 715/230 |
| 2010/0325686 A1 | 12/2010 | Davis et al. |
| 2011/0055180 A1 | 3/2011 | Lumley et al. |
| 2011/0078615 A1* | 3/2011 | Bier ...................... G06Q 10/10 715/779 |
| 2011/0088091 A1 | 4/2011 | Petronijevic et al. |
| 2011/0099152 A1* | 4/2011 | Law .................. G06F 17/30115 707/689 |
| 2011/0145593 A1 | 6/2011 | Auradkar et al. |
| 2011/0153680 A1 | 6/2011 | Rolla et al. |
| 2011/0178981 A1 | 7/2011 | Bowen et al. |
| 2011/0197266 A1 | 8/2011 | Chu et al. |
| 2011/0231222 A1 | 9/2011 | Sharma et al. |
| 2011/0289105 A1 | 11/2011 | Hershowitz |
| 2011/0296517 A1 | 12/2011 | Grigoriev et al. |
| 2011/0302210 A1* | 12/2011 | Comanescu ........... G06Q 50/18 707/784 |
| 2011/0320925 A1* | 12/2011 | Piersol ................... G06Q 10/06 715/231 |
| 2012/0030553 A1 | 2/2012 | Delpha et al. |
| 2012/0136936 A1 | 5/2012 | Quintuna |
| 2012/0192086 A1 | 7/2012 | Ghods et al. |
| 2012/0222132 A1 | 8/2012 | Burger et al. |
| 2012/0284605 A1 | 11/2012 | Sitrick et al. |
| 2012/0323968 A1 | 12/2012 | Yih et al. |
| 2013/0013560 A1 | 1/2013 | Goldberg et al. |
| 2013/0061125 A1* | 3/2013 | O'Mara ................ G06F 17/241 715/232 |
| 2013/0104028 A1* | 4/2013 | Murray ............... G06F 15/0291 715/234 |
| 2013/0151970 A1 | 6/2013 | Achour |
| 2013/0191451 A1 | 7/2013 | Tse et al. |
| 2013/0219176 A1 | 8/2013 | Akella et al. |
| 2013/0246901 A1* | 9/2013 | Massand ................. G06F 17/24 715/229 |
| 2013/0311420 A1 | 11/2013 | Tehranchi et al. |
| 2014/0026025 A1 | 1/2014 | Smith |
| 2014/0074905 A1 | 3/2014 | Schincariol et al. |
| 2014/0089775 A1* | 3/2014 | Worsley ............. G06F 17/30575 715/230 |
| 2014/0101310 A1* | 4/2014 | Savage ..................... H04L 43/00 709/224 |
| 2014/0115436 A1* | 4/2014 | Beaver ................. G06F 17/2288 715/229 |
| 2014/0115450 A1 | 4/2014 | Zhong et al. |
| 2014/0143446 A1 | 5/2014 | Jacobson et al. |
| 2014/0173137 A1 | 6/2014 | Jacobson et al. |
| 2014/0196115 A1 | 7/2014 | Pelykh |
| 2014/0229556 A1 | 8/2014 | Cooper et al. |
| 2014/0250073 A1 | 9/2014 | Zalpuri et al. |
| 2014/0281875 A1* | 9/2014 | Branton ................. G06F 17/241 715/230 |
| 2014/0282921 A1 | 9/2014 | Filman et al. |
| 2014/0351907 A1 | 11/2014 | Noble |
| 2015/0067150 A1 | 3/2015 | Heredia et al. |
| 2015/0106378 A1 | 4/2015 | Clark et al. |
| 2015/0134600 A1* | 5/2015 | Eisner ................. G06F 17/30011 707/608 |
| 2015/0169500 A1 | 6/2015 | Balinsky et al. |
| 2015/0199379 A1 | 7/2015 | Thierer et al. |
| 2015/0199416 A1 | 7/2015 | Kashyap et al. |
| 2015/0227514 A1 | 8/2015 | Gillett et al. |
| 2015/0236849 A1 | 8/2015 | Ayday et al. |
| 2016/0156631 A1 | 6/2016 | Viswanathan et al. |
| 2016/0224735 A1 | 8/2016 | Ayday et al. |
| 2018/0004828 A1 | 1/2018 | Kathuria et al. |
| 2018/0004829 A1 | 1/2018 | Kathuria et al. |
| 2018/0097812 A1 | 4/2018 | Gillett et al. |
| 2018/0375730 A1 | 12/2018 | Anand et al. |
| 2019/0014395 A1 | 1/2019 | Anand et al. |

(56) References Cited

U.S. PATENT DOCUMENTS

FOREIGN PATENT DOCUMENTS

| JP | 2005228253 | A | 8/2005 |
|----|------------|---|--------|
| JP | 2007501969 | A | 2/2007 |
| JP | 2009086742 | A | 4/2009 |
| JP | 2010034920 | A | 2/2010 |
| JP | 2011191862 |   | 9/2011 |
| JP | 2012209809 | A | 10/2012 |
| KR | 20100080802 | A | 7/2010 |
| KR | 20110000655 | A | 1/2011 |
| KR | 101159504 | B1 | 6/2012 |
| KR | 20140092831 | A | 7/2014 |
| WO | 2009105735 | A2 | 8/2009 |

OTHER PUBLICATIONS

International Search Report and Written Opinion dated Mar. 31, 2015, in International Patent Application No. PCT/US2014/64875, filed Nov. 10, 2014.

International Search Report and Written Opinion dated Aug. 28, 2015, International Patent Application No. PCT/US2015/014911, filed Feb. 6, 2015.

Kong et al., "Graphical Overlays: Using Layered Elements to Aid Chart Reading," IEEE Transactions on Visualization and Computer Graphics 18(21): 2631-2638, published online Oct. 9, 2012, print publication Dec. 1, 2012.

"Decision of Patent Grant dated Oct. 2, 2017," Korean Patent Application No. 10-2016-7015415, filed Nov. 10, 2014, four pages.

Australian Notice of Acceptance for Patent Application dated Nov. 17, 2017, Patent Application No. 2014346473, filed Nov. 10, 2014, 3 pages.

Japanese Final Rejection dated Mar. 26, 2018, Patent Application No. 2016-528236, filed Nov. 10, 2014, 4 pages.

"Extended European Search Report, dated Oct. 27, 2017," European Patent Application No. 14859862.6, filed Nov. 10, 2014, 12 pages.

Canadian Office Action dated Jun. 28, 2018, Patent Application No. 2930415, filed Nov. 10, 2014, 4 pages.

Doi et al., "A proposal of an Annotation System CollabSticky Focused on Collecting Comments in Presentation," Information Processing Society of Japan 2007(1):159-164, Jul. 2007.

He et al, "RIDEE-SPS: Presentation System for Realtime Interactive Distance Education Environment," Information Processing Society of Japan 44(3):700-708, Mar. 15, 2003.

Japanese First Office Action dated Oct. 15, 2018, Patent Application No. 2018-138930, filed Nov. 10, 2014, 4 pages.

Canadian Office Action dated Jun. 4, 2019, Patent Application No. 2930415, filed Nov. 10, 2014, 3 pages.

Chinese Second Office Action dated Jun. 18, 2019, Patent Application No. 201480072858.7, filed Nov. 10, 2014, 3 pages.

European Communication under Rule 71(3) EPC dated Jun. 7, 2019, Patent Application No. 14859862.6, filed Nov. 10, 2014, 48 pages.

Fujita et al., "Comprehensive Manual for Editing and Publishing Books for Amazon Kindle (p. 162)," MD Corporation, Inc., Jul. 21, 2013, 4 pages.

Japanese Final Rejection dated Mar. 4, 2019, Patent Application No. 2018-138930, filed Nov. 10, 2014, 3 pages.

Japanese Office Action dated Mar. 25, 2019, Patent Application No. 2016-528236, filed Nov. 10, 2014, 17 pages.

Wikipedia, "Portable Document Format," May 4, 2011 (retrieved Jun. 13, 2019), https://web.archive.org/web/20110504202116/http://en.wikipedia.org/wiki/PDF#Annotating_PDFs, 21 pages.

Chinese First Office Action dated Dec. 3, 2018, Patent Application No. 201480072858.7, filed Nov. 10, 2014, 8 pages.

Singaporean Notice of Eligibility for Grant and Supplementary Examination Report dated Dec. 24, 2018, Patent Application No. 11201603644X, filed Nov. 10, 2014, 3 pages.

Einziger et al., "TinySet—An Access Efficient Self Adjusting Bloom Filter Construction," IEEE/ACM Transactions on Networking 25(4):2295-2307, Aug. 2017.

Eppstein et al., "Straggler identification in round-trip data streams via Newton's identities and invertible Bloom filters," IEEE Transactions on Knowledge and Data Engineering 23(2):297-306, Aug. 19, 2010.

Goodrich et al., "Invertible Bloom Lookup Tables," 49th Annual Allerton Conference on Communication, Control, and Computing, Sep. 28, 2011, 24 pages.

Chinese Notice of Grant dated Oct. 9, 2019, Patent Application No. 201480072858.7, filed Nov. 10, 2014, 4 pages.

Japanese Appeal Decision dated Oct. 28, 2019, Patent Application No. 2016-528236, filed Nov. 10, 2014, 23 pages.

* cited by examiner

DOCUMENT VERSION CONTROL IN COLLABORATIVE ENVIRONMENT

CROSS-REFERENCE TO RELATED APPLICATIONS

This application incorporates by reference for all purposes the full disclosure of U.S. patent application Ser. No. 14/077,195, filed concurrently herewith, entitled "HOMOGENOUS CAPTURE OF DOCUMENT INTERACTIONS," U.S. patent application Ser. No. 14/077,204, filed concurrently herewith, entitled "DOCUMENT MANAGEMENT AND COLLABORATION SYSTEM," U.S. patent application Ser. No. 14/077,201, filed concurrently herewith, entitled "CROSS-PLATFORM HOMOGENOUS DOCUMENT COLLABORATION," and U.S. patent application Ser. No. 14/077,209, filed concurrently herewith, entitled "PROCESSING SERVICE REQUESTS FOR NON-TRANSACTIONAL DATABASES."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include personal computers, tablets, smartphones, laptops and other devices.

Furthermore, ensuring that the documents and other data are displayed uniformly cross-platform is challenging given the variety of hardware and software components of different devices. In addition to displaying documents and other data across a variety of platforms in a uniform manner, there are challenges in allowing users of the organization to edit and collaborate with others when accessing or editing the documents or other data on various devices.

BRIEF DESCRIPTION OF THE DRAWINGS

Various embodiments in accordance with the present disclosure will be described with reference to the drawings, in which.

DETAILED DESCRIPTION

Figure 1:
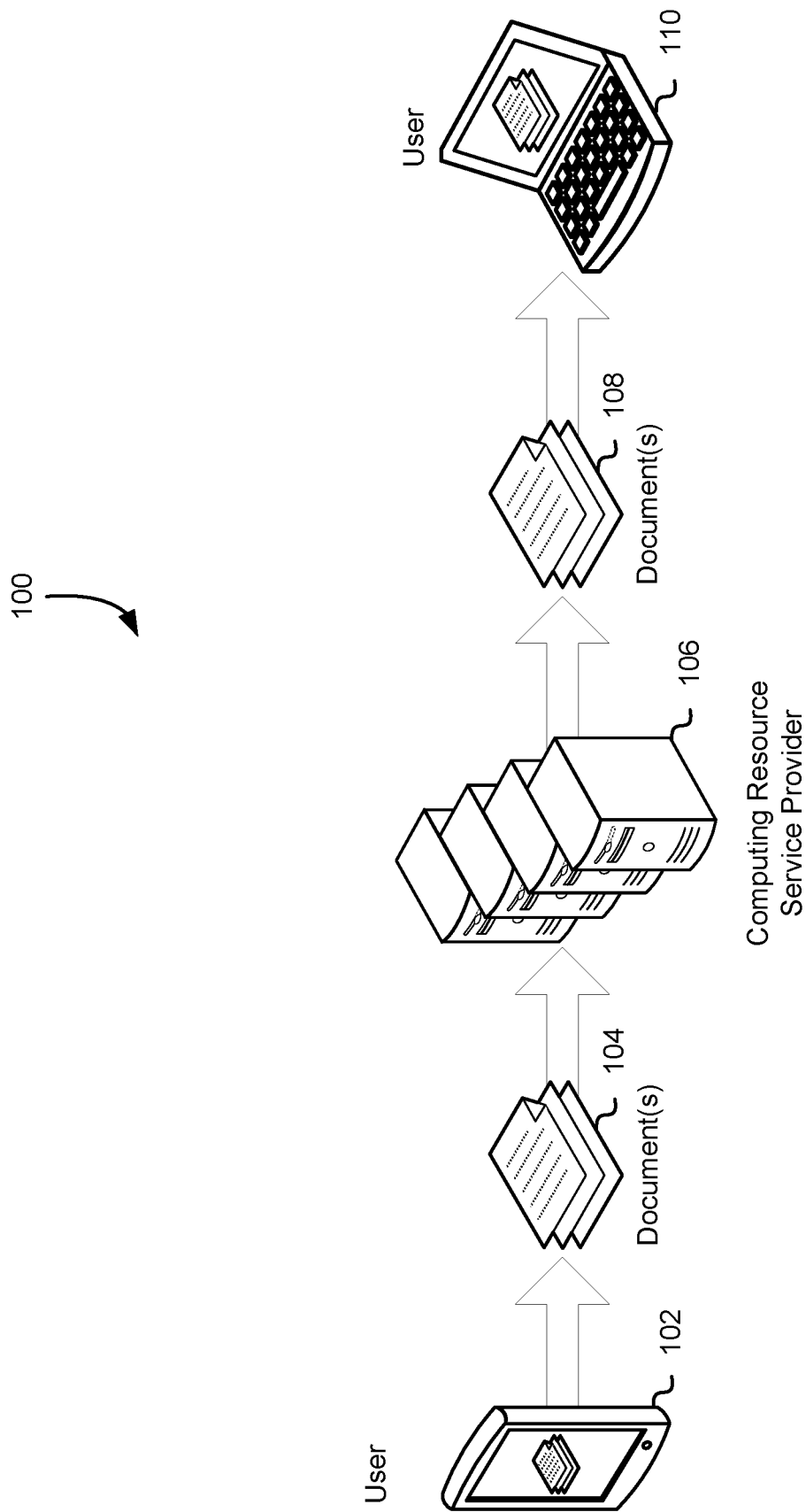
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for document management and document collaboration systems. Document collaboration between users of an organization's computer systems may be enhanced by converting documents into a universal file format, such as portable document format (PDF), and allowing users to generate annotations or comments for selected words and phrases in the document. In various embodiments, users may transmit documents to remote computing resources operated by a computing resource service provider. The service provider may, if the document is not already in a universal file format, convert the document to a universal file format. The document in universal file format may also be referred to as an underlay. Furthermore, if the document in PDF format (either natively or once it has been converted) is above a certain size it may be compressed, split into one or more documents, converted to another file format, the resolution of the document may be lowered or any other suitable technique for reducing the document's size may be used before the coordinate map is generated based at least in part on the document. For example, a user may create a document on a computer system of an organization and transmit the document to the service provider to enable remote storage of the document and collaboration on the document with other users of the organization. The computer resource service provider (also referred to simply as a service provider) may then convert the document into a PDF version using one or more services or systems of the service provider. The service provider may then create a coordinate map based at least in part on the document in PDF format and the Cartesian coordinate system of the PDF file format. The generated coordinate map (also referred to as the annotation index) may be used for displaying user selections and annotations in the uploaded document. In various embodiments, the coordinate map may be a separate file from the document or may be included as information in the document.

Users of the organization may request document(s) from the service provider using one or more computing devices, such as a tablet, smart phone, laptop, desktop, workstation or any other suitable computing device. The service provider may then, as a result of the request, transmit the document, the generated coordinate map and any other data associated with the document to the computing device from which the user transmitted the request. The coordinate map may include one or more files generated from the document in the universal file format indicating the position of each word in the document or may be included in the document once it has been converted to the appropriate file format. The PDF file format contains a device independent coordinate system that may be used to display the PDF file. The underlay and coordinate map may be stored in the same remote storage systems as the document or in one or more other remote storage systems. In various embodiments, other data associated with the document includes comments, annotations or selections made by one or more users. Other data associated with the document may be combined into a single file (also referred to as an overlay) for use in displaying collaborations between users. In various embodiments, the information contained in the overlay is stored in the document. For example, the user may interact with the document through a computing device and generate annotations for a selection of text in the document, the annotations and associated selection of text may be stored in the document. The document may contain the coordinate map as well.

Once received by the computing device of the user, the computing device may display the document and the other data associated with the document based at least in part on the overlay, the coordinate map and the underlay. For example, the coordinate map may provide the coordinates for each word in the document and the overlay may provide the annotations to the documents created by various users and the location of the annotations relative to the coordinates of the words in the coordinate map. The user may then collaborate on the document by making selections and providing annotations to the document displayed to the user. The user's interactions with the document may be captured by the computing device and stored locally until the user submits the document to the service provider for remote storage. For example, the user may select a group of words from the document using a cursor controlled by a pointing device, such as a mouse. Once the user has made a selection and the computing device has determined that the user has completed the selection, the user may be prompted to perform one or more other actions, such as providing a comment or selecting a highlight function. The selection of words and actions performed by the user may be stored locally and the computing device may capture one or more other user interactions with the document. Once the user has completed collaboration on the document, the user may submit the document to the service provider for storage by selecting the submit operation. The computing device may then execute a batch job which transmits the locally saved user interactions to the service provider.

The batch job may include the underlay, coordinate map and overlay along with the saved user interactions. Once received by the service provider, the service provider may store the document as a new version and update data corresponding to the document information. For example, the service provider may update the version information corresponding to the document. Saving each newly uploaded document as a new version of the document may include determining if any changes were made to the document, generating new underlays, new coordinate maps, and overlays for the document, updating one or more search indexes corresponding to the document and notifying collaborators and owners of the document that a new version has been uploaded. Furthermore, local versions of the document may be preserved such that changes made to the document stored remotely will not be reflected in the local documents until the user has uploaded their local files and updated the local client. The user may also select a previous version of the document to roll back to. Furthermore, each new version of the document may be assigned a new version identification number but retain that same document identification number. Saving each newly submitted document as a new version of the same document and preserving local files until they are submitted facilitates collaboration on the document without the need to use other files to manage conflicts between document versions.

In various embodiments, the saved user interactions include location coordinates for the words selected by the user and annotations associated with the location coordinates. This information may be stored separately as a new version of the overlay in a storage system maintained by the service provider, or may overwrite a previously stored version of the overlay or may be stored in the document itself. One or more databases may be used to record information corresponding to the underlay, coordinate map and overlay and the database may also contain the location of the underlay, coordinate map and overlay.

The user's documents, including the underlay, coordinate map and overlay corresponding to the documents, may be processed by one or more systems or services of the service provider to enable document collaboration between different users on different devices in a homogenous manner across a variety of different software and hardware architectures. The service provider may convert all the documents to a document format which uses a device independent coordinate system to describe the surface of a page in the document. The documents may then be processed by the service provider as a stream of text in order to determine the location coordinates of each character. Each character's location may be determined by creating a bounding box around the characters. The service provider may then determine a bounding box for each line of the document. Based at least in part on the line bounding boxes and the character bounding boxes, the service provider may determine bounding boxes for the words in the document. Determining the bounding boxes for all the words in the document allows for selected text comments and annotations to be displayed in a uniform way across multiple different devices. The service provider processing normalizes the documents so that they can be displayed in an identical manner across a variety of different platforms and avoid load on the computing devices of the user. The coordinate map enables consistent display of the information contained in the overlay across multiple computing devices with different display characteristics, such as different resolutions, different display sizes, different aspect ratios and any other differences displays of the multiple devices. When used by the computing device to display the document, the coordinate causes the annotations to be displayed in connection with the same words regardless of the display characteristics of a particular display that displays the overlay and document.

FIG. 1 shows an illustrative example of an aspect of a document collaboration system in accordance with the present disclosure. Accordingly, FIG. 1 shows environment 100 which illustrates an example of a customer operating a computing device 102, such as a smart phone or tablet. During operation of the computing device 102 a user may interact with the computing device and cause operations on one or more documents and/or the creation of one or more documents. The documents and operations performed by the user may be saved locally on the computing device 102. The computing device may then, as a result of a request by the user, transmit the document(s) 104 to one or more systems 106 of the computing resource service provider. The one or more systems 106 of the service provider may be used by the service provider to provide services and resources. The documents 104 may be newly created documents by the user on the computing device 102 or the documents may be new versions of already existing documents which the user has collaborated on. The computing device 102 may transmit, to the service provider, the document and other data corresponding to the document such as metadata, user data, version data, underlay, coordinate map, overlay, comments, annotations, document identification information or any other data suitable for document collaboration.

Once received by the service provider, various systems 106 of the service provider may process the documents. For example, a system of the service provider may update a database with information corresponding to the document. Various other files may be created by one or more systems of the service provider such as an overlay and underlay. In various embodiments, the received documents 104 are converted to a universal file format from which a coordinate map may be created. File formats may include portable document format (PDF), an image file or any file format capable of identical display across different computing devices. The service provider may also generate an overlay based on the data submitted with the document. The underlay and coordinate map may be used to uniformly display annotations and other information in the documents on other computing devices. One or more systems 106 of the service provider may store the documents in native format, documents generated by converting the documents into a different format, the underlays generated from the converted document, the coordinate maps generated based at least in part on the document, the overlays created from information corresponding to the document and any other data corresponding to the document. For example, the service provider may store the document in the original format as transmitted by the computing device of the user and the document converted into the universal file format in the same storage system. Other data may include version history, permission, requests and any other data suitable for document collaboration.

Another user may request, from computing device 110, one or more documents 108 from the service provider. In various embodiments, documents 108 are the same as documents 104 transmitted from computing device 102. Computing device 110 may send a request to a system 106 of the service provider. The service provider may determine the document identifier from the submitted request and query a database to determine the location of the requested document and the corresponding files. The document identifier may be a globally unique identifier for a document which may be separate from a version identifier which may identify a particular version of the document. The corresponding files may include the underlay, coordinate map, overlay and any metadata associated with the documents. The service provider may collect the files and transmit the collected files to the computing device 110. In various embodiments the service provider transmits the location of the files to the computing device 110 and the computing device requests the documents directly from the location transmitted.

Once the computing device 110 has received the documents 108 and corresponding files, the documents may be displayed in such a way that when displayed on computing device 110, the documents appear the same as when displayed on computing device 102. For example, the service provider may transmit the overlay, underlay, coordinate map and the corresponding metadata. The computing device 110 may use the coordinate map to determine where to draw the annotations stored in the overlay, such that they appear in the same place as the annotations appeared in the document when displayed by computing device 102. Various devices may display the images differently due to different screen sizes and resolutions, but the determination of where to draw the annotations is based on a device independent coordinate system and is not affected by differences in devices.

Figure 2:
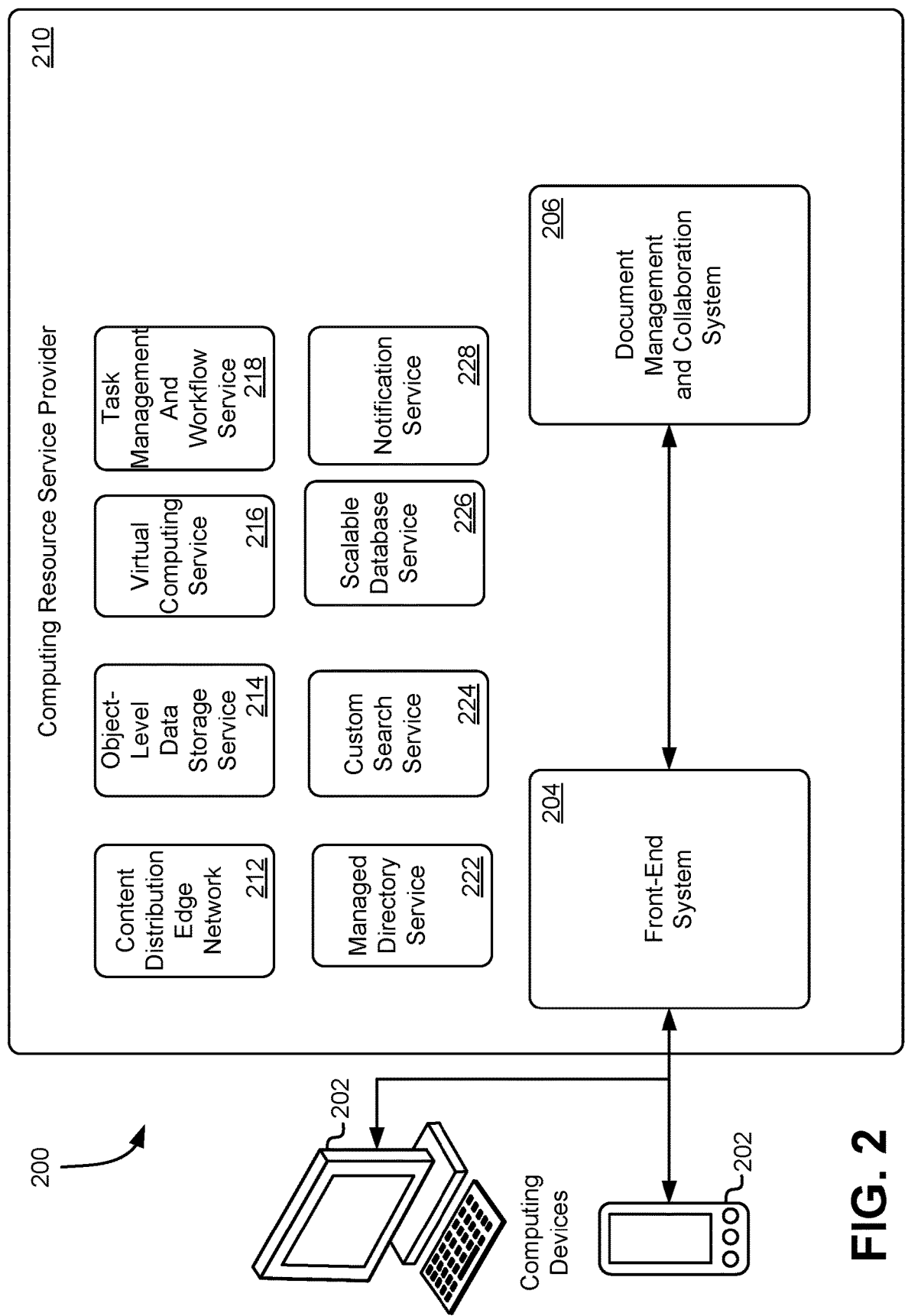
FIG. 2 shows an illustrative example of an environment in which various embodiments of the present disclosure may be practiced.

FIG. 2 shows an example of an environment 200 in which computing devices connected to a computing resource service provider in accordance with at least one embodiment.

The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touch screen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The customer may be an organization that may utilize one or more of the services provided by the computing resource service provider 210 to maintain and deliver information to its employees, which may be located in various geographical locations. Additionally, the customer may be an individual that utilizes the services of the computing resource service provider 210 to deliver content to a working group located remotely.

The computing resource service provider 210 includes a front-end system 204 and a document management and collaboration system 206 as well as plurality of services and systems as shown in FIG. 2. These include a content distribution edge network 212, an object-level data storage service 214, a virtual computing service 216, a task management and workflow service 218, a managed directory service 222, a custom search service 224, a scalable database service 226 and a notification service 228. It is noted that in various embodiments, the computing resource service provider 210 may include fewer services and systems than those described with references to FIG. 2 or may include additional or alternative services or systems to those described with reference to FIG. 2. Further, in alternative embodiments, the systems and services may be utilized outside the context of the service provider 210. For example, the services and systems may be stand-alone or used in conjunction with systems and services other than those described with reference to FIG. 2.

The front-end system 204 may be a gateway to the document management and collaboration system 206 and may offer private and public services to user or customer and their computing devices 202. Access to the front-end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user or a device before granting access to the resources of the document management and collaboration system 206. The authentication may be based on credentials, such as username and password information, or access tokens, among others. The front-end system 204 may provide services and interfaces that permit or enable customer access. For example, the front-end system 204 may enable a web-based platform or a console-based platform that provides information related to the services of the computing resource service provider 210 to the customer. Further, the front-end system 204 may enable the customer to execute applications or tasks in the computing resource service provider 210, track and manage the execution of the applications or tasks and receive the results of the execution and transmit the results to user devices. As further described herein, the front-end system 204 may be the gateway by which the customer or its associated devices 202 may utilize the plurality of services provided by the computing resource service provider 210.

The document management and collaboration system 206 enables and manages the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 210, the term document is not limited to media, such as audio-visual media. A document may be a computer files that are capable of being produced by or edited or viewed using a productivity program or suite. Accordingly, the document may be editable or non-editable text, images, drawings and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in responses to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document (for example, document source files), underlays, previews, thumbnails, extracted document text, annotation indices or truth tables.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enables executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the custom search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents or users. For example, the scalable database service 226 may store metadata for underlays, overlays, documents, feedback or comments. In addition, the scalable database service 226 may store metadata associated with users, organizations and permissions. As a non-relational database, the scalable database service 226 may guarantee atomic writes to a single item in a single table. Accordingly, a single write may be synchronously performed to a truth table and remaining writes may be performed asynchronously using workflows.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates. The notification service 228 may further be used for various purposes, such as monitoring applications that are being executed in the virtual computer system service 216, workflow systems, time-sensitive information updates, mobile applications, and many others.

Figure 3:
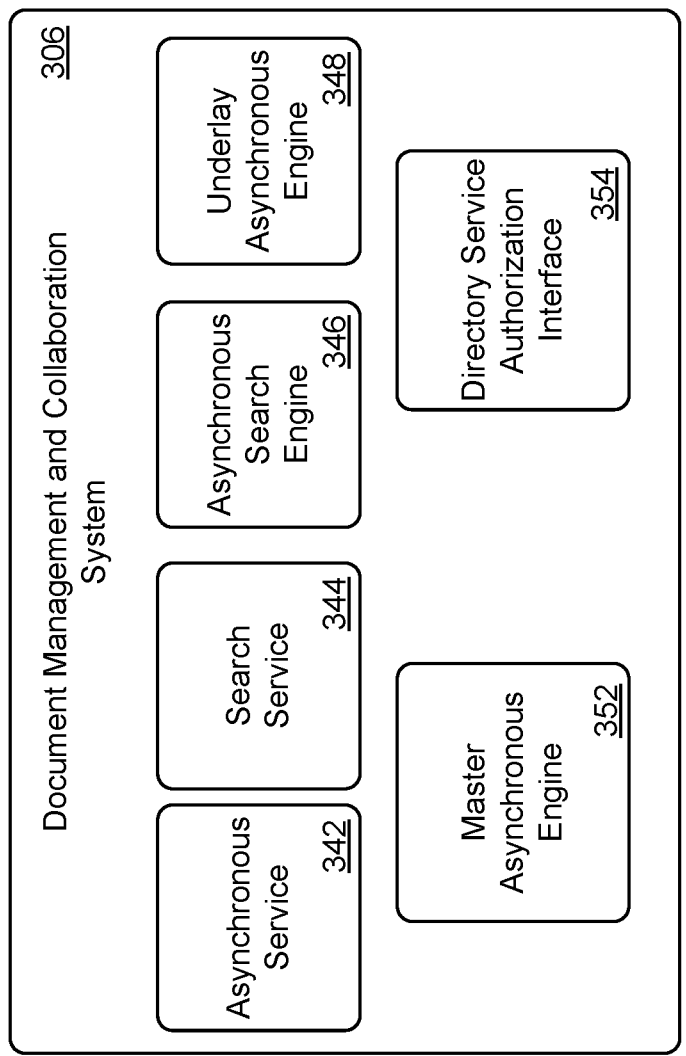
FIG. 3 shows an illustrative example of an environment in which various embodiments of the present disclosure may be practiced.
Figure 3:
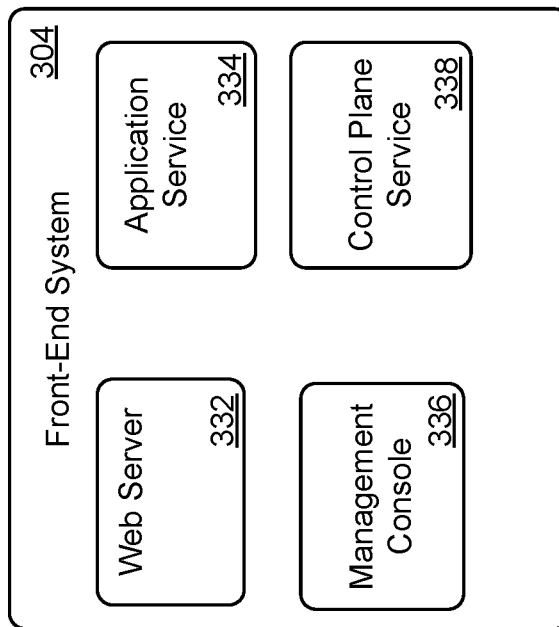

FIG. 3 shows the functional entities of the front-end system and the document management and collaboration system 306 in accordance with at least one embodiment. The front-end system 304 includes a web server 332, an application service 334, a management console 336 and a control plane service 338. The web server 332 may enable the execution of a web site, a single-page web application or a single-page interface that permits a user to transmit or upload documents to the document management and collaboration system 306 and manage the documents. The web server may further enable the user to view and edit documents, underlays or overlays and provide commentary or feedback on the documents, underlays or overlays. The web server 332 may also enable an administrator or a user to set permissions or share modes that specify the privileges given to a user in accessing documents. In addition, the web server may enable users or devices to submit authentication or authorization credentials. The content distribution edge network, described with reference to numeral 212 in FIG. 2, may be used to distribute content of the web server 332. The actions performed by the user may be done via a website, an application or a management console and the web server 332 may enable executing the website, application or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call and the application service 334 may process the request and manage its execution. The application service 334 may cause the synchronous execution of actions associated with a received request or alternatively may cause one or more actions that require more complex processing to be queued for asynchronous execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access token validation from the managed directory service 222 or may cause search indices maintained by the custom search service 224 to be updated.

The management console 336 may be a collection of computing devices and other resources collectively configured to permit organizations, administrators and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users) and security setting (for example, password and encryption).

The control plane service 338 of the front-end system 304 may be a collection of computing devices and other resources collectively configured to serve as an interface that enables creating new computing instances for document collaboration and management.

Instances may be created by transparently creating a directory in the managed directory service 222 or associating an existing directory (for example, maintained by the managed directory service 222 or by a user or administrators) for document management and collaboration. The control plane service 338 may be utilized to create a document directory and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system includes an asynchronous service 342, a search service 344, an asynchronous search engine 346, an underlay asynchronous engine 348, a master asynchronous engine 352 and a directory service authorization interface 354. The asynchronous service 342 may be a collection of computing devices and other resources collectively configured to manage the execution of asynchronous workflows. The asynchronous service 342 may include or be connected to a queue that stores asynchronous events for execution. The asynchronous service 342 may coordinate the execution of asynchronous workflows with the master asynchronous engine 352, which may be responsible for scheduling activities associated with the workflow. The activities may include underlay generation and text extraction. As described herein, the execution of workflow activities or tasks may be performed by engines or workers. For example, the asynchronous search engine 346 may be tasked with performing text extraction activities and the underlay asynchronous engine 348 may be tasked with performing activities associated with underlay creation.

In the course of executing asynchronous workflows, the asynchronous search engine 346 and the underlay asynchronous engine 348 may obtain or download documents or files from the object-level data storage service 214 and cause documents or files to be stored in the object-level data storage service 214. Further, the engines may generate documents of any file type based on received documents, perform text extraction and store annotations. In addition, the asynchronous search engine 346 may place search index updates associated with document in a queue for processing by the search service 344. The updates may be associated with search indices maintained by the custom search service 224 described with reference to FIG. 2 herein.

The search service 344 may be a collection of computing devices and other resources collectively configured to perform batch processing on the search index updates in the queue and launch a workflow for performing search index update activities. Upon launching the workflow, the asynchronous search engine 346 causes search indices to be updated in the custom search service 224. The directory service authorization interface 354 enables the document management and collaboration system 306 to delegate user authentication to another entity such the cross-premises directory service described with reference to numeral 222 in FIG. 2. The document management and collaboration system 306 may submit user access tokens to the authenticating party via the directory service authorization interface 354 and may receive a response indicating whether a user may be authenticated.

Figure 4:
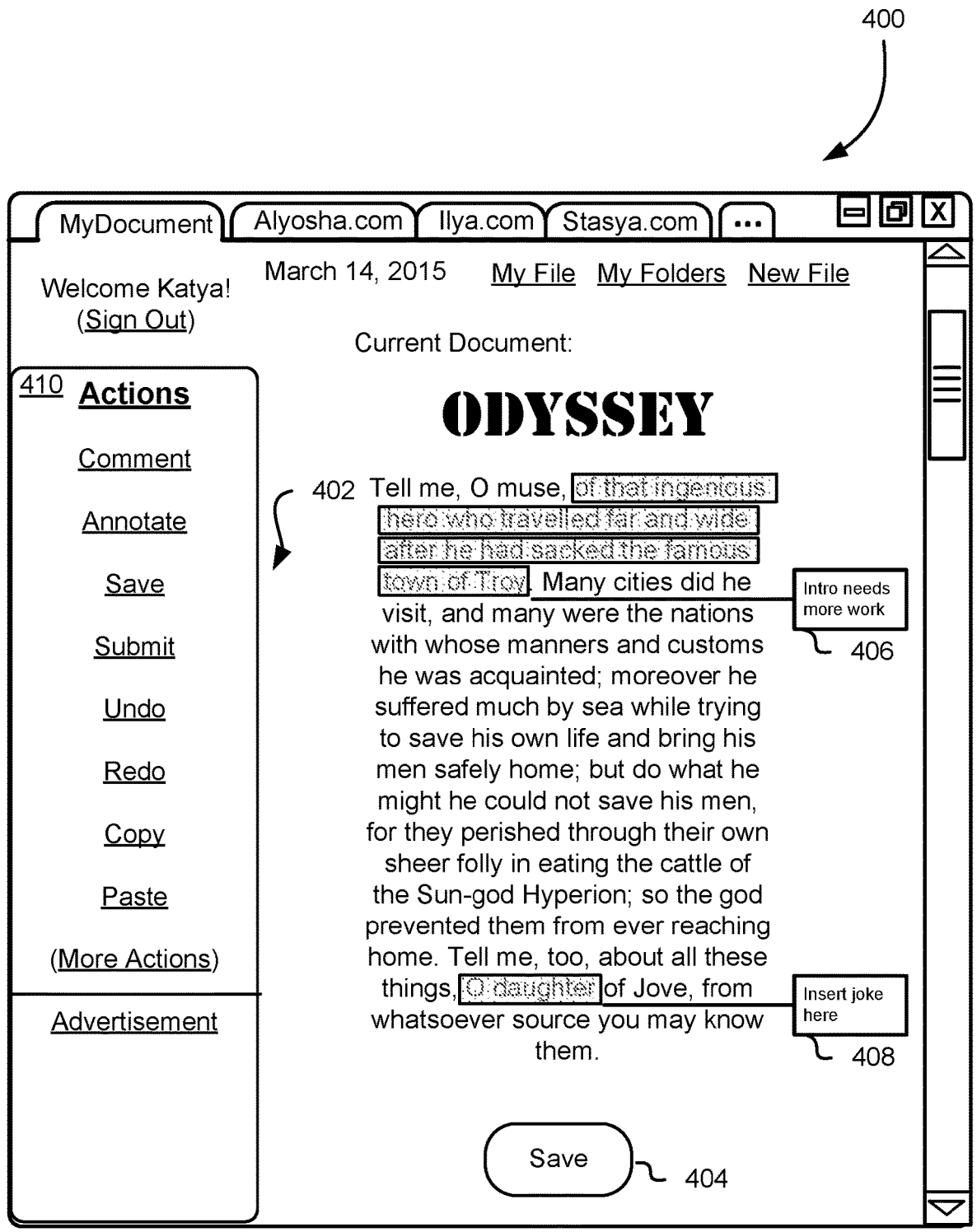
FIG. 4 shows a diagram illustrating a web page in accordance with various aspects of the present disclosure.

FIG. 4 is an illustrative example of a webpage 400 which may be used to provide URLs in accordance with various embodiments. As illustrated in FIG. 4, the webpage 400 includes various content. The content illustrated in the webpage 400 is illustrative in nature and the type and appearance and amounts of content may vary in accordance with various embodiments. The webpage 400 may be provided in various ways in accordance with various embodiments. For example, the webpage may be provided over a network to an application such as a browser application of a client. The webpage 400, however, may be provided generally by any suitable device capable of receiving and processing a webpage. While a webpage 400 is used for the purpose of illustration, URLs or other resource locators configured in accordance with the various embodiments described herein may be provided in content in various ways in accordance with various embodiments. For example, content may be provided to a particular application of the client such as a synchronization client, which is not necessarily classified as a browser application. Generally, any way by which URLs or other resource locators may be provided are considered to be within the scope of the present disclosure.

As illustrated in FIG. 4, the webpage 400 includes various graphical user interface elements that enable navigation throughout a website of which the webpage 400 is a part. In this example, the webpage 400 is part of an enterprise level document management and collaboration system. For instance, on the left-hand side of the webpage 400, various links 402 to various actions 410 that may be performed on the document may be displayed. In this example, the links appear as textual words which enable the links to be selected using an appropriate input device such as a keyboard, mouse, touchscreen or other input device. Selection of one of the links 402 may cause an application of the webpage 400 to be displayed, to submit, pursuant to a URL associated with the selected link by the programming of the webpage 400, an http request to a server that provided the webpage 400 or another server. In this example, the webpage 400 also includes a graphical user element configured as a save button 404. The save button 404 may be a graphical user interface element of the webpage 400 where the underlying code of the webpage 400 is configured such that selection by an input device of the save button 404 causes information corresponding to the document and/or user interaction with the document to be saved locally.

The webpage 400 may display the current document the user is interacting with. The user may be interacting with the document using one or more appropriate input devices. For example, a user may highlight a portion of text with a mouse and select the annotated link from the actions 410 on the left-hand side. This may prompt the user to enter annotations associated with the selected text. The selected text and associated annotations 406 and 408 may be displayed on the webpage 400. A user may save annotations, comments and highlighted text by selecting the save function. By selecting the save function, the user's interactions with the document may be written to local memory such as a hard disk drive. In various embodiments, user interactions are being periodically saved to local memory and saved as a draft. User collaborations on the document may also be stored remotely with the service provider. For example, a user may collaborate on a document and upon completion submit the document to the service provider in order to be stored remotely. When a user selects to submit a document, the user's computing device may generate a batch job including the underlay, overlay, annotations, metadata and any other information suitable for processing of the document by the service provider. For example, the user's computing device may generate a hash of the files to be transmitted to the service provider for remote storage. The service provider may use the hash of the files to determine if any changes were made to the file.

During interaction with the document displayed by webpage 400 it may be possible for another user to interact with and submit edits to the same document from another device. The system may save the latest received document as the most recent version of the document. While the user is editing the document, the interactions that are saved locally may be preserved if even another version of the document is submitted during this time. Once the user has submitted the locally saved edits to the document, the system may generate a new version of the document based at least in part on the document submitted by the user and update the document and corresponding information saved locally based at least in part on any previous versions of the document not accounted for locally during the time the user was editing the document.

Figure 5:
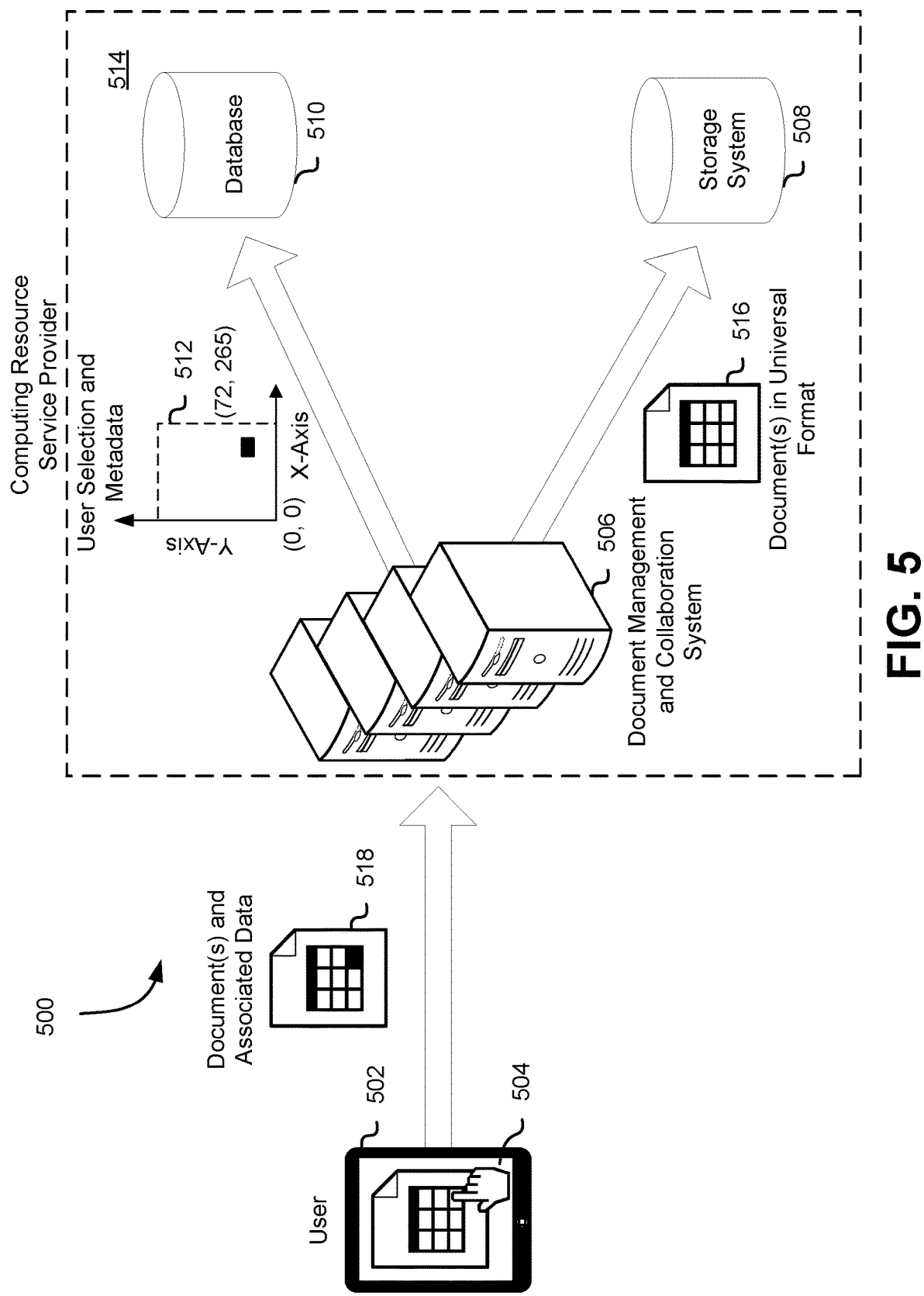
FIG. 5 shows a diagram illustrating document management in accordance with various aspects of the present disclosure.

FIG. 5 shows a diagram illustrating document management in accordance with various aspects of the present disclosure. In particular, FIG. 5 shows environment 500 which illustrates an example of a user operating a computing device 502 such as a smart phone or tablet. The user may have collaborated on the document by providing a selection and associated annotation 504. The document may have been created by the user or may have been created by another user. The other user may have requested collaboration on the document. Collaboration on the document may include activities such as selection of text 504 and the creation of and/or modification of annotations corresponding to the selection. Once the user has collaborated on the document, the user may then submit the document to the service provider. Submission of the document to the service provider may include the computing device 502 transmitting the document 518 and associated data to the document management and collaboration system 506. The associated data may include created and/or modified annotations, comments, text selection or any other collaborative actions performed in the document.

In various embodiments, the transmitted files are received by one or more other systems of the service provider and are directed to the appropriate system. For example, the service provider may operate one or more listening devices on a network responsible for receiving requests from users of the service provider and directing the requests to the appropriate system. These other systems may first cause the documents 518 and associated data to be stored in the storage system 508 of the service provider and provide notification to the document management and collaboration system 506 that documents 518 and associated data have been stored in the storage system 508. For example, a listening device may receive a request from the user to process documents 518 and associated data. The listening device may then cause the document 518 and associated data to be stored in the storage system 508. After the document 518 and associated data has been stored in storage system 508, the listening device may transmit a notification including a URL to the location of the stored file to the document management and collaboration system 506. Upon receiving the notification from the listening device the document management and collaboration system 506 may download the documents 518 and associated data based at least in part on the URL included in the notification. The document management and collaboration system 506, the database 510 and the storage system 508 may be located in one or more data centers 514 of the service provider.

The documents 518 and associated data may include the document in the file format it was originally received by the document management and collaboration system 506, annotations created by the user, a hash of the documents, a hash of the associated data, an overlay, an underlay, a coordinate map, a timestamp or any other information suitable for document collaboration. Furthermore, the documents 518 and associated data may be provided by an API call to the service provider. Once received by the document management and collaboration system 506, the document management and collaboration system may determine if the documents 518 have been changed. If the documents 518 have been changed, the documents can be saved as a new version of the documents 518. However, if the documents 518 have not been changed, they may not be processed and overhead from processing the files may be reduced.

The document management and collaboration system 506 may determine if the documents 518 and/or the associated data has changed in a variety of different ways. For instance, the hash submitted with the documents 518 and associated data may be compared with a hash of a previous version of the documents and any associated data corresponding to the particular version of the document in order to determine if a change has been made. The hash may further include all or a portion of the file path to determine if a change has been made to the directory structure.

In another example, an invertible bloom filter may be used to determine if a change has been made in the document. The invertible bloom filter may be a data structure containing at least key value pairs (e.g., a value x and the hash of x), a counter for each key value pair indicating the number of times each key value pair has been used and the XOR of all the keys that hash into that cell. The invertible bloom filter may also randomly combine elements using an XOR function. The document management and collaboration system 506 may maintain the invertible bloom filter for the documents 518. When a document is received from the computing device, the document management and collaboration system 506 may insert the document into the invertible bloom filter and invert the invertible bloom filter to determine if any new information has been inserted into the invertible bloom filter. Inversion of the invertible bloom filter will indicate whether changes were made to the document relative to one or more previous versions of the document.

Once it is determined that a change has been made to the documents 518 and/or the associated data, a new version of the document may be stored based at least in part on the documents 518 and associated data transmitted by computing device 502. Information corresponding to the document 512 may be written into a database 510 entry corresponding to the document. The information corresponding to the document 512 may include metadata corresponding to the document and the particular version of the document. Furthermore, the information corresponding to the document may be based at least in part on the document 518 and data associated with the document as transmitted by the computing device 502. For example, a new version identification number may be generated and written into the database 510 along with the raw coordinate of the user's selection of text and associated annotations. Other information such as a Uniform Resource Locator (URL) for the documents 518 may also be written into the database. Information corresponding to the user responsible for submitting the documents 518 and associated data. The annotations or changes submitted by the user may also be stored in the database 510. In various embodiments, the database 510 contains the raw coordinates for the user selection and only the document in universal file format 516 is stored in the storage system 508.

After the information in the database has been updated, the document management and collaboration system 506 can stored the new versions of the documents 518 and associated data.

The document management and collaboration system 506 may retrieve the documents 518 and associated data from the storage system 508 of the service provider or the document management and collaboration system may have received the documents 518 directly from the computing device 502. The document management and collaboration system 506 may receive the underlay and overlay from the computing device 502 and associated the underlay and overlay with a new version of the document. If the documents 518 as received are not in the universal file format the document management and collaboration system may covert the document 518 to a universal file format and generate the associated coordinate map. Generating the underlay and coordinate map are described in greater detail below with reference to FIG. 7. Along with the underlay and coordinate map, one or more thumbnail images of the documents may also be generated.

The document management and collaboration system 506 may store the annotations and/or comments included in the documents 518 and associated data when saving the new version of the document. As described above, the annotations to a document may be stored in a separate file which may contain both the annotations and the coordinates of the user selected text associated with the annotations. This information may be used by a user device to draw the highlighted words and the associated comments. The document management and collaboration system 506 may receive the user annotations and associated text selection directly from the computing device 502 from which the user enter the information or from some other service or system of the service provider. The document management and collaboration system 506 may update the annotation index using the user annotations and associated coordinates of the user selected words based at least in part on the bounding box for each word. The text of the annotations and/or the documents 518 may be extracted in order to enable searching of the documents. In various embodiments, the extracted text is transmitted to one or more other systems of the service provider in order to update a search index which enables users to search documents stored remotely by the service provider.

After a new version of the document is stored, a notification may be sent to one or more users specified in the database. For example, the user specified as the owner or creator of the document may be notified that a new version of the document has been created. In another example, if the documents 518 and associated data were transmitted to a particular user for collaboration, the user responsible for having the documents 518 and associated data transmitted to the particular user may be notified that the requested collaborator has uploaded a new version of the document. The notification may be sent by one or more systems of the service provider and may include e-mail, SMS or any other suitable means for notifying a user.

New versions of the documents 518 and associated data may be stored by the service provider without an explicit command to make a new version of the documents 518 and associated data. For example, when a user collaborates on and/or edits a document and submits the document for storage with the service provider, the documents 518 and associated data transmitted from the user's computing device 502 to the service provider are used to store a new version of the document without an explicit command from the user to make a new version of the document. Furthermore previous versions of documents 518 and associated data may be persistently stored in one or more storage systems of the service provider until deleted by explicit command to delete or another event (e.g., an account remaining inactive for a specified amount of time). Previous versions of the documents may be combined into one or more files in order to conserve storage capacity. In various embodiments, only the changes between various versions of the documents 518 are saved in the storage system.

Some or all previous versions of the documents 518 may be retained by the document management and collaboration system 506. The document management and collaboration system 506 may also maintain version-specific information such as a change log indicating the changes between versions of the document for each version of the documents 518. The user may be able to select one or more particular versions of the documents 518 to review or the user may review a change log or other information indicating the changes between one or more selected versions of the documents 518. The document management and collaboration system 506 may display all versions of the documents 518 to the user and the user may be able to roll back the documents 518 to a particular version of the documents 518 other than the latest version of the documents 518. The user may select a particular annotation displayed by the computing device 502 and request the particular version of the document in which the particular annotation was first introduced. The computing device 502 may then request from the document management and collaboration system the particular version of the document in which the selected annotation was added. As a result of the request, the document management and collaboration system 506 may transmit the particular version of the document to the computing device 502. The user may also be able to search previous versions of the documents 518, using keywords or other information.

Figure 6:
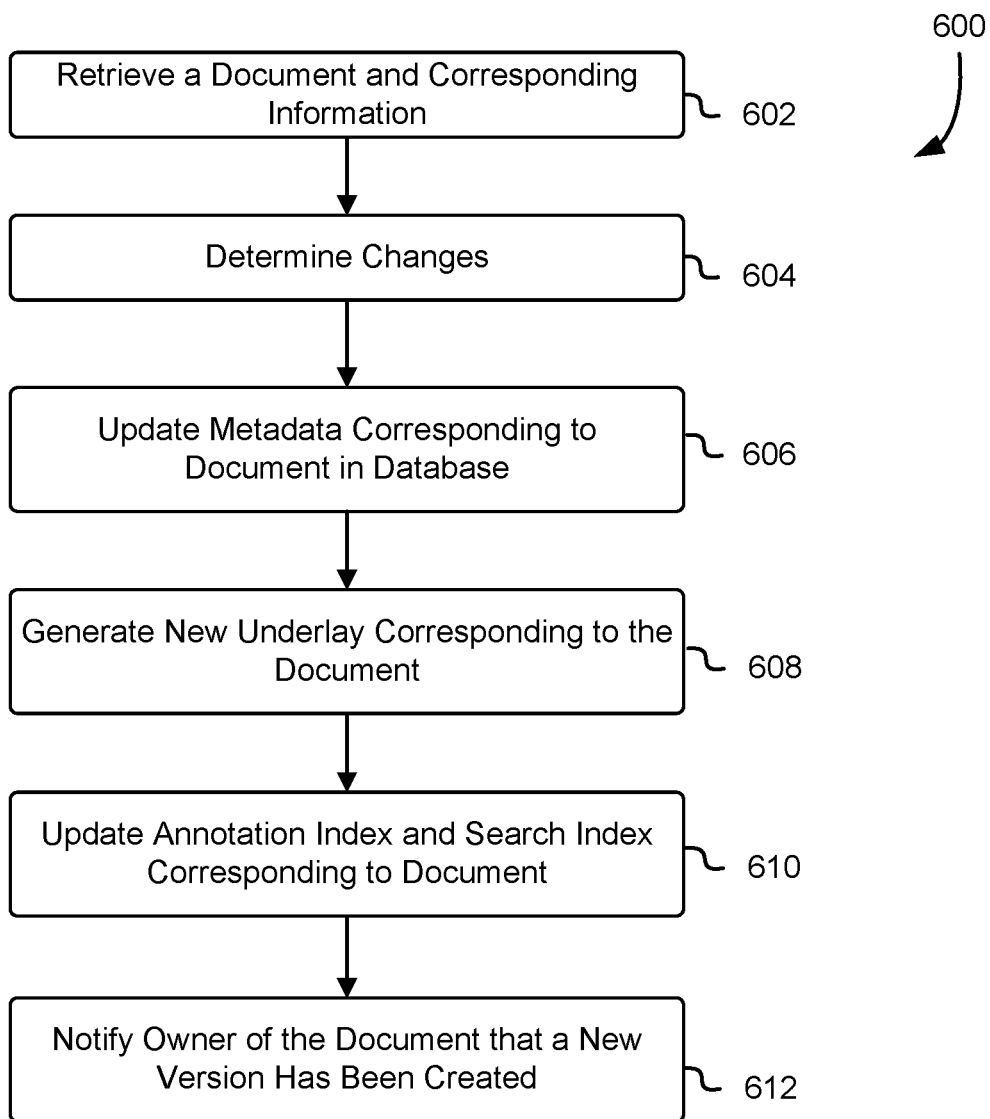
FIG. 6 shows an illustrative example of a process for receiving a document from a user in accordance with at least one embodiment.

FIG. 6 shows an illustrative example of process 600 which may be used to create a new version of an existing document received from a user of the service provider. The process 600 may be performed by any suitable system, such document management and collaboration system 506, described above in connection to FIG. 5. Returning to FIG. 6, in an embodiment, the process 600 includes receiving a document from a user 602. The document may be received over a network connection through a web-based graphical user interface. The document may also be received over a mobile network connection through a client application executing on a portable computing device. The user may be a collaborator on a document with one or more permissions to edit the particular document. The user may generate annotations, comments or other edits using a computing device such as those described above with reference to FIG. 2.

The computing device may transmit the document directly to the document management and collaboration system performing process 600 or some other system, such as a remote storage system. If the document is stored remotely on the storage system, the document management and collaboration system may download the document and any other corresponding file directly from the remote storage system.

The document management and collaboration system may determine if the document received contains any differences between the document received and at least on other previous version of the document 604. One or all previous versions of the document may be stored remotely by the service provider. In numerous alternatives to process 600, if there are no changes in the document, then the current version and the previous version may be considered identical and the document received from the user may not be processed by the document management and collaboration system. In order to determine if there is a change in the document 604 a variety of techniques may be used. Bit comparison (or other bitwise operation) may be performed between the document received from the user and one or more previous versions of the document stored by the service provider. As described above, a hash of the received document and a previous version of the document may be generated to determine changes in the document.

Returning to process 600, if it is determined that changes have been made to the document, the document may be processed and saved as a new version of an existing document.

Information corresponding to the document may be stored in one or more databases of the service provider 606. A particular document may have one or more entries in the database corresponding to information about the document. For example, the database may contain one or more globally unique identifiers for the document, one or more globally unique identifiers for the version of the document, one or more permissions associated with the document, a timestamp for receipt of the document, a URL or other information corresponding to the location of the document and any other suitable information for maintaining information corresponding to a document. The information stored in the database may be updated based at least in part on the creation of a new version of the document. The document management and collaboration system may optimistically process as many writes to the database as possible and queue the rest of the information to be written to the database when the resources become available. In this manner the process 600 may continue while information is still being written to the database. For example, the document management and collaboration system may generate an identifier for the new document version and proceed with generating the files for the new version of the document while other actions are still being performed such as setting the permissions for the new version of the document.

Generating the files corresponding to the new version of the document may include generating a new underlay 608. Generating the underlay will be discussed in greater detail with reference to FIG. 7. In numerous variations to process 600, the underlay corresponding to a previous version of the document may be used instead of generating a new underlay. Creating the underlay may be performed by the document management and collaboration system or some other system of the service provider. Once created, the underlay may be stored along with the original document or in a separate location. In various embodiments, the original document is destroyed once the underlay is generated from the document.

In order for the new version of the document to represent the changes made by the user responsible for uploading the new version of the document, the annotation index and other files must be updated 610. The annotation index may be an annotated transparency page that when displayed over the underlay on any particular computing device enables the computing device to display the annotations and highlighted text. The annotation index may contain one or more annotations and/or markups of the document done by the user responsible for uploading the new version of the document. One or more files corresponding to the annotation index may be created, such as an overlay described above. These files may be stored by the computing resource service provider. In numerous variations of the process, the annotation index may be stored in the underlay. The annotations may be received from the user and generated based at least in part on the words in the document. For example, the computing device may determine a start word and an end word for a user selection and transmit the start word and end word to the document management and collaboration system along with the user's annotations. The document management and collaboration system may then determine based on the start word and the end word, the location of the user selected text and the annotation corresponding to the text selection. Updating the annotation index 610 may also include extracting text from the document or the annotations in order to update a search index for the document and enable searching on the new version of the document. The extracted text may be sent to one or more other systems of the service provider to update the search index.

One or more notifications may be sent once the new version of the document has been created 612. Notifications may be sent to one or more other systems of the service provider indicating that the new version of the document has been created. A notification may also be sent to the user responsible for uploading the new version of the document. A determination on where to send a notification may be made based at least in part on information contained in the database such as permission rights of the document. For example, a notification may be sent to all users with write access to the document but not the user with read only access.

Figure 7:
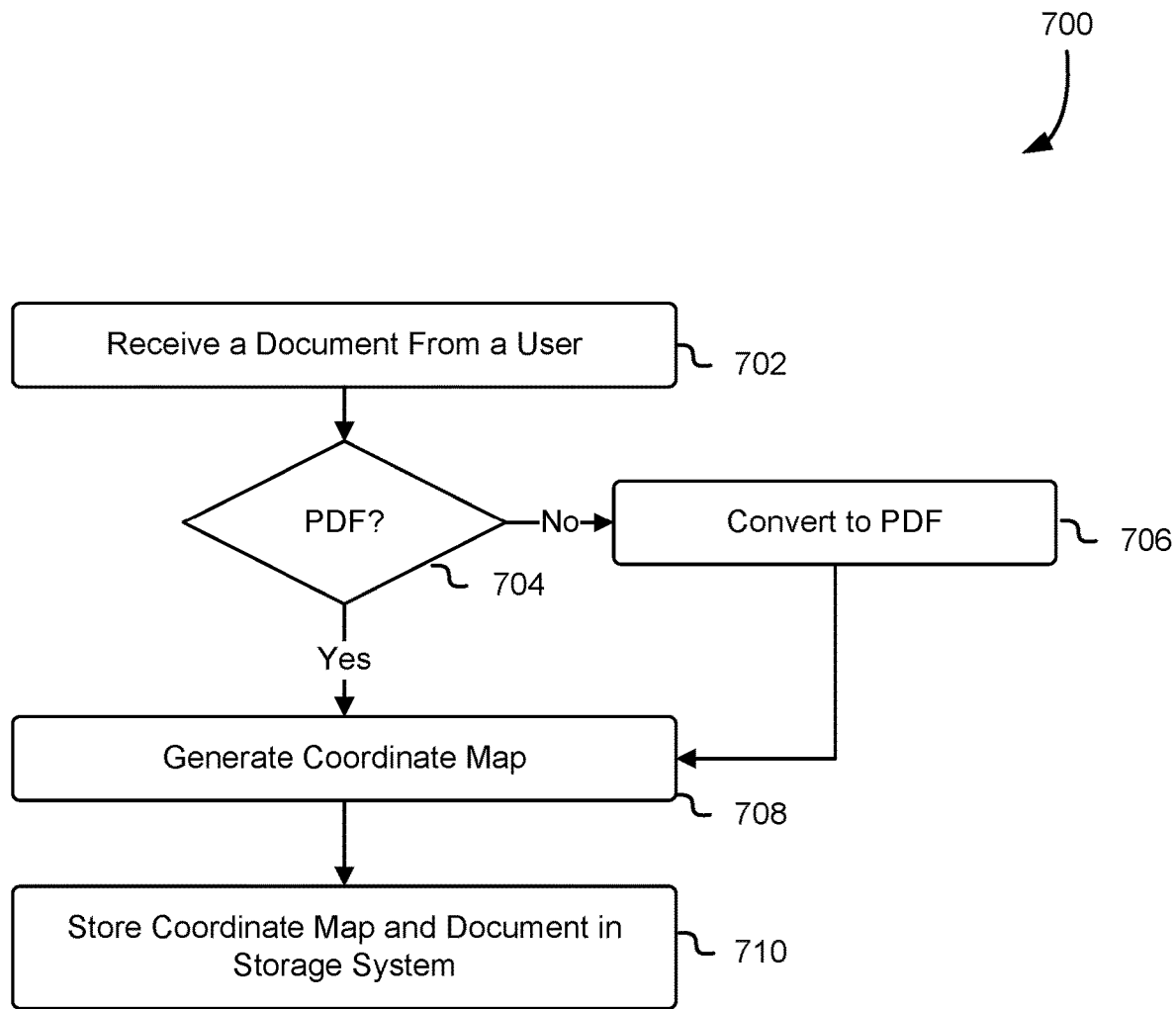
FIG. 7 shows an illustrative example of a process for creating an underlay of a document in accordance with at least one embodiment.

FIG. 7 shows an illustrative example of process 700 which may be used to create an underlay of a document capable of being used by a variety of computing devices in order to create a homogenous display of the document from which it was created across the variety of computing devices. The process 700 may be performed by any suitable system, such document management and collaboration system 506, described above in connection to FIG. 5. Returning to FIG. 7, in an embodiment, the process 700 includes, receiving a document from a user 702. The document may be received directly from the user or indirectly from the user. For example, the user may have uploaded the document to one or more systems of the service provider and the one or more systems of the service provider may transmit the document. Other systems of the service provider may include the document management and collaboration system described above in reference to FIG. 6 responsible for generating a new version of a document and corresponding underlay.

Returning to process 700, once the document is received it may be determined if the document is in PDF format 704. If the document is not in PDF format it may be converted to PDF format 706. In numerous variations of process 700, other file formats may be used such as image file formats. If the document is already in PDF format, process 700 may continue and generate a coordinate map corresponding to the document 708. The coordinate map may be based on the location of character, word or delimiters in the document. In various embodiments, the coordinate map is a JavaScript Object Notation (JSON) file generated based at least in part on the document, where the JSON file defines word bounding boxes for all the words contained in the files. A variety of techniques may be used to generate the coordinate map. For example, the document is converted to PDF file format and may be then processed as a steam of characters. For each character in the document the document management and collaboration system may determine the top-left coordinate, the height and width for each particular character. Each character in a line of the document may then be bound together with a line bounding box. The line bounding box may be generated by processing the stream of characters until a delimiter indicating the end of the line is reached. Line bounding boxes may also be generated by determining if the two consecutive character processed in the stream satisfy the conditions for being on the same line.

For example, two characters may be considered on the same line if the top-left coordinate of the first character is above the top-left of the second character and the base of the first character is above the base of the second character. For any two consecutive characters in the stream, the document management and collaboration system may determine this information based at least in part on the top-left coordinate, the height and width determined for each character. Other conditions exist that, if satisfied, indicate that two characters are on the same line. If the top-left coordinate of the second character is above the top-left of the first character and the base of the second character is above the base of the first character, the character can be considered on the same line. Similarly if the top-left coordinate and the base of either character is within the top-left coordinate and the base of the other character, the character can be considered on the same line.

Once it is determined that two consecutive characters are no longer on the same line, the end of the line bounding box may be drawn. The line bounding box may be drawn by using the top-left coordinate of the first character on the line and the top-left coordinate and width of the last character in the line. After all the line bounding boxes are computed, each line may be processed individually to determine a bounding box for each word in the line. As the document is processed the average width of whitespaces and characters in the document is computed. If the distance between current characters and the next character is less than average width of the characters in the document as computed, the characters may be considered as belonging to the same word. If the distance is greater than the average width of the character in the document, the next character may be considered as the next word in the line bounding box. Once it is determined that the next character belongs to the next word, the document management and collaboration system may generate the word bounding boxes in a similar manner as it did the line bounding box.

Once the document management and collaboration system has generated the word bounding boxes it may be determined from the bounding boxes the coordinates of each word in the document. Padding may also be added to each bounding box around the words in order to facilitate user selection of words during collaboration of a document. The document management and collaboration system may determine an appropriate amount of padding to add to each word bounding box based at least in part on the height of each line and the spacing between line, dividing the area proportionally in such a way that the word bounding boxes touch. The bounding box information generated by the document management and collaboration system may be stored in a file such as a JSON file. The file may be stored with the original document in a storage system of the service provider 710.

Figure 8:
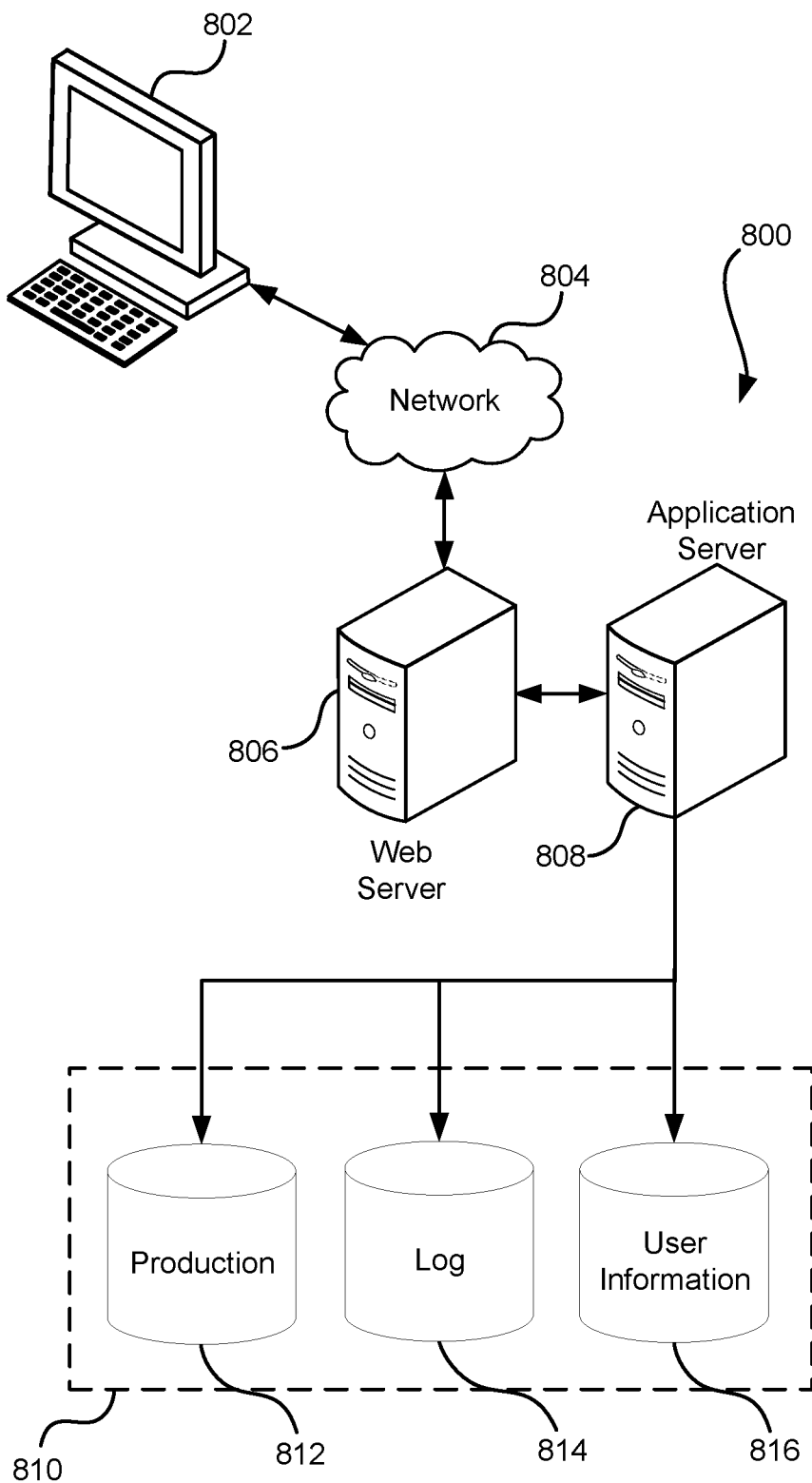
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCPlP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B. and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a user, a request to generate a new version of a document, the request comprising document information that is locally stored on a user computing device and specifies a set of user interactions with the document;
   causing the document information to be preserved on the user computing device until the new version of the document is generated; and
   processing the document information to generate the new version of the document, by at least:
      entering the document into a bloom filter;
      inverting the bloom filter to determine that the document does not correspond to one or more previous versions of the document;
      as a result, updating metadata corresponding to the new version of the document in a database;
      generating a new overlay containing information corresponding to interactions with words in the document information, a new underlay containing information corresponding to the words in the document information, and a new coordinate map specifying location coordinates of characters in the new underlay; and
      storing the new coordinate map, the new underlay, and the new overlay in a storage system as the new version of the document such that the new version of the document and all other versions of the document are accessible simultaneously, the new underlay stored separately from the document.

2. The computer-implemented method of claim 1, wherein obtaining the new version of the document to be stored remotely from the user further includes obtaining information indicating user selection of text in the document and associated annotations.

3. The computer-implemented method of claim 2, wherein generating the new overlay includes generating, based at least in part on the information indicating user selection of text in the document and associated annotations, the new overlay such that the new overlay comprises information indicating how to display the associated annotations based at least in part on coordinates of the user selection of text relative to the location coordinates specified in the new coordinate map.

4. The computer-implemented method of claim 1, wherein updating metadata corresponding to the new version of the document includes generating version identification information for the new version of the document and associating the version identification information with document identification information corresponding to the document.

5. The computer-implemented method of claim 1, wherein the computer-implemented method further includes:
   determining one or more other users specified as a collaborator of the document; and
   transmitting to the one or more other users of the document an indication that the new version of the document has been created.

6. The computer-implemented method of claim 1, wherein the computer-implemented method further includes restoring, based at least in part on a request from the user, a previous version of the document.

7. A system, comprising:
   one or more processors; and
   memory with instructions that, upon execution by the one or more processors, cause the system to:
      obtain, over a network, a request to generate a new version of a document from a user, the request comprising document information that is locally stored on a user computing device and specifies a set of user interactions with the document;
      cause the set of user interactions to be preserved locally on the user computing device even when another request to generate the new version of the document is obtained from another computing device; and
      as a result of obtaining the request, process the document information to generate the new version of the document by at least:
         adding the document information to a probabilistic data structure;
         determining that the document information does not match at least one other document information included in the probabilistic data structure by at least inverting the probabilistic data structure;
         updating a database entry corresponding to the document to include information corresponding to the new version of the document;
         generating a coordinate map, an underlay and an overlay based at least in part on the document information, the underlay containing information corresponding to text in the document information, and the coordinate map specifying location coordinates of characters in the underlay; and
         updating a search index based at least in part on information corresponding to the document, the coordinate map being stored and transmitted separately from the document.

8. The system of claim 7, wherein the memory further includes instructions that, when executed by the one or more processors, cause the system to:
   determine if a version of the document includes changed content relative to a previous version of the document by at least:
      generating, based at least in part on the version of the document including associated data indicating user interaction with text in the version of the document, a first hash;

generating, based at least in part on a previous version of the document including second associated data indicating user interaction with text in the previous version of the document, a second hash; and performing a comparison between the first hash and the second hash, wherein storing the document as the new version is conditioned upon on a determination that the version is different than the previous version based on a result of the comparison.

9. The system of claim 7, wherein obtaining the version of the document from the user further includes obtaining, from the user, secondary information corresponding to the document.

10. The system of claim 9, wherein the obtained secondary information corresponding to the version of the document includes, at least one of, user selection of text in the document, comments on the document, or user selection of text in the document with associated annotations.

11. The system of claim 9, wherein generating the overlay is performed such that the overlay includes the secondary information corresponding to the document.

12. The system of claim 7, wherein updating the database entry corresponding to the document includes writing a uniform resource location of the document into a database containing the database entry.

13. The system of claim 7, wherein the memory further includes instructions that, when executed by the one or more processors, cause the system to, as a result of a request from the user, roll the document back to a previous version.

14. A non-transitory computer-readable storage medium storing executable instructions that, upon execution by one or more processors of a computer system, cause the computer system to at least:
 determine that document information for generating a new version of a document has been obtained from data storage of a user device, the document information including data corresponding to a set of user interactions with the document;
 cause the document information to be continuously stored on the data storage in response to submission of a request; and
 as a result of determining that the document information has been uploaded, cause the computer system to process the document information to at least:
  include the document in a data structure, the data structure used to track version history of the document;
  generate a determination that the document does not correspond to one or more previous versions of the document included in the data structure by at least inverting the data structure;
  as a result of the determination, update a database entry corresponding to the document such that the database entry contains information corresponding to the new version of the document;
  generate at least an overlay based at least in part on the data corresponding to the set of user interactions, an underlay based at least in part on text extracted from the document, and a coordinate map specifying location coordinates of characters in the underlay; and
  make the new version of the document and at least one previous version of the document available, the underlay being stored separately from the data storage in which the document is stored.

15. The non-transitory computer-readable storage medium of claim 14, wherein the executable instructions further comprise instructions that, upon execution by the one or more processors, cause the computer system to notify a user based at least in part on a result of updating the database entry corresponding to the document.

16. The non-transitory computer-readable storage medium of claim 14, wherein the executable instructions that cause the computer system to determine the new version of the document has been uploaded further include instructions that cause the computer system to determine that changes have been made to the document.

17. The non-transitory computer-readable storage medium of claim 14, wherein the data associated with the document includes information based on a user's interaction with the document.

18. The non-transitory computer-readable storage medium of claim 14, wherein the executable instructions that cause the computer system to generate at least the underlay further include instructions that cause the computer system to generate a coordinate map of each word in the document based at least in part on the document.

19. The non-transitory computer-readable storage medium of claim 14, wherein the executable instructions that cause the computer system to update the database entry corresponding to the document further include instructions that cause the computer system to update the database entry with a timestamp corresponding to the time at which uploading of the document was completed.

20. The non-transitory computer-readable storage medium of claim 14, wherein the executable instructions that cause the computer system to update the database entry corresponding to the document further include instructions that cause the computer system to associate, in the database entry corresponding to the document, a new version identification corresponding to the new version of the document that has been uploaded.

21. The non-transitory computer-readable storage medium of claim 14, wherein the executable instructions further comprise instructions that, upon execution by the one or more processors, cause the computer system to:
 generate a change log that indicates one or more differences between different versions of the document;
 obtain a selection specifying at least one of the one or more of the differences indicated in the change log; and
 transmit a particular version of the document corresponding to the selection.

22. The non-transitory computer-readable storage medium of claim 14, wherein the executable instructions further comprise instructions that, upon execution by the one or more processors, cause the computer system to:
 obtain, from a user, information indicating a particular version of the document;
 determine a location of the particular version of the document and a particular version of a particular overlay corresponding to the particular version of the document; and
 transmit the particular version of the document and the particular version of the overlay to the user.

* * * * *